United States Patent
Saak et al.

(10) Patent No.: US 6,475,254 B1
(45) Date of Patent: Nov. 5, 2002

(54) FUNCTIONALLY GRADED COATINGS FOR ABRASIVE PARTICLES AND USE THEREOF IN VITREOUS MATRIX COMPOSITES

(75) Inventors: Aaron W. Saak, Gahanna, OH (US); Mark P. D'Evelyn, Niskayuna, NY (US); Chung S. Kim, Columbus, OH (US); Michael H. Zimmerman, Westerville, OH (US); Steven W. Webb, Worthington, OH (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/987,863

(22) Filed: Nov. 16, 2001

(51) Int. Cl.$^7$ .............................. C09K 3/14; B24D 3/14; B24D 3/00
(52) U.S. Cl. ........................................... 51/307; 51/309
(58) Field of Search .......................... 51/307, 308, 309; 428/403, 404

(56) References Cited

U.S. PATENT DOCUMENTS

| | | | | | |
|---|---|---|---|---|---|
| 4,011,064 A | * | 3/1977 | Lee et al. | ..................... | 427/212 |
| 4,063,907 A | * | 12/1977 | Lee et al. | ..................... | 427/212 |
| 4,951,427 A | * | 8/1990 | St. Pierre | ..................... | 51/293 |
| 5,611,828 A | * | 3/1997 | Celikkaya | ..................... | 51/293 |
| 5,628,806 A | * | 5/1997 | Celikkaya et al. | ............. | 51/293 |
| 5,641,330 A | * | 6/1997 | Celikkaya et al. | ............. | 51/293 |

* cited by examiner

*Primary Examiner*—Michael Marcheschi

(57) ABSTRACT

Coated abrasive particle for use in vitreous bond matrices, which particle is coated with between 1 and about 50 coating layers. Each coating layer ranges in thickness from between about 0.1 and 50 microns. Each layer has the composition, $MC_xN_yB_zO_w$, where M represents one or more of Ti, Si, V, Cr, Zr, Nb, Mo, Hf, Ta, W, Re or a rare earth metal, and w, x, y, and z, each range from between 0 and 3. The outermost coating layer has a concentration of oxygen that is higher by a factor of at least about 2 than the layer in direct contact with the abrasive particle.

15 Claims, 6 Drawing Sheets

FUNCTIONALLY GRADED COATINGS FOR ABRASIVE PARTICLES AND USE THEREOF IN VITREOUS MATRIX COMPOSITES

CROSS-REFERENCE TO RELATED APPLICATIONS

None

STATEMENT REGARDING FEDERALLY SPONSORED RESEARCH

Not applicable.

BACKGROUND OF THE INVENTION

The present invention relates to vitreous bond grinding elements containing metal coated superabrasive particles or grit and more particularly to the use of functionally graded coatings for improved wetting of the coated particles by the vitreous bond matrices.

Refractory metal oxides (titania, zirconia, alumina, silica) coatings on diamond, CBN, and silicon carbides for use in grinding elements have been proposed (see U.S. Pat. Nos. 4,951,427 and 5,104,422). Processing of these coatings includes deposition of an elemental metal (Ti, Zr, Al) on the abrasive particle surface followed by oxidizing the sample at an appropriate temperature to convert the metal to an oxide. Unfortunately, these coatings often crack do to inherent brittleness of the oxide layer and residual stresses developed from the mismatch in thermal expansion coefficients between the oxide and abrasive particle. In practice, these abrasive particles pull out of the matrix during grinding when the interface between the coating and abrasive particle is weak.

Retaining the crystals in the bond is a major factor that determines the usable lifetime of a grinding wheel. Coated crystals pulling out from the vitreous bond during grinding is one of the major failure modes of grinding wheels. There are two bond lines to consider when working with coated abrasive crystals. One bond line is the diamond/coating bond line and the second is the coating/matrix bond line. Failure of either bond will result in pull out of the coated crystals and shortened life of the grinding element containing the coated crystals. Thus, there exists a need in the art for coated abrasive crystals, which provide improved retention in vitreous bonds.

BRIEF SUMMARY OF THE INVENTION

The retention of metal oxide coated superabrasive particles in a vitreous bond matrix is improved by incorporating functionally graded coated abrasive particles in the vitreous bond matrix. Diamond, cubic boron nitride, silicon carbide, and like abrasive particles are useful for this purpose. The novel functionally graded coated abrasive particles have an outer oxide phase coating layer derived from a metal carbide, nitride, and/or boride, which forms an inner coating layer. The coating provides improved adhesion of the abrasive particles in the matrix and protection against chemical attack during tool fabrication and processing.

The invention, then, is directed to coated abrasive particles for use in vitreous bond matrices. The particles are coated with between 1 and about 50 coating layers. Each coating layer ranges in thickness from between about 0.1 and 50 microns. Each layer has the composition, $MC_XN_YB_ZO_W$, where, M represents one or more of Ti, Si, V, Cr, Zr, Nb, Mo, Hf, Ta, W, Re or a rare earth metal, and w, x, y, and z, each range from between 0 and 3. The outermost coating layer has a concentration of oxygen that is higher by a factor of at least about 2 than the layer in direct contact with the abrasive particle.

The coating layers can be formed by depositing between 1 and about 50 layers of a coating of the composition, $MC_XN_YB_Z$. An outermost layer(s) enriched in oxygen by a factor of at least about 2 compared to the coating layer in direct contact with the abrasive particle is formed by reaction of oxygen with the carbide/nitride/boride coated abrasive particles.

The functionally graded coated abrasive particles, then, can be incorporated with matrix materials for forming a vitreous bond grinding element. Matrix materials include vitreous bond material, $SiO_2$, $B_2O_3$, $Na_2O$, $CaO$, $MgO$, or other similar glass forming materials. Conventional processing common in the art is used to form the vitreous bond grinding elements. Improved grinding performance results from using such grinding elements

BRIEF DESCRIPTION OF THE DRAWINGS

For a fuller understanding of the nature and advantages of the present invention, reference should be had to the following detailed description taken in connection with the accompanying drawings, in which.

Figure 1:
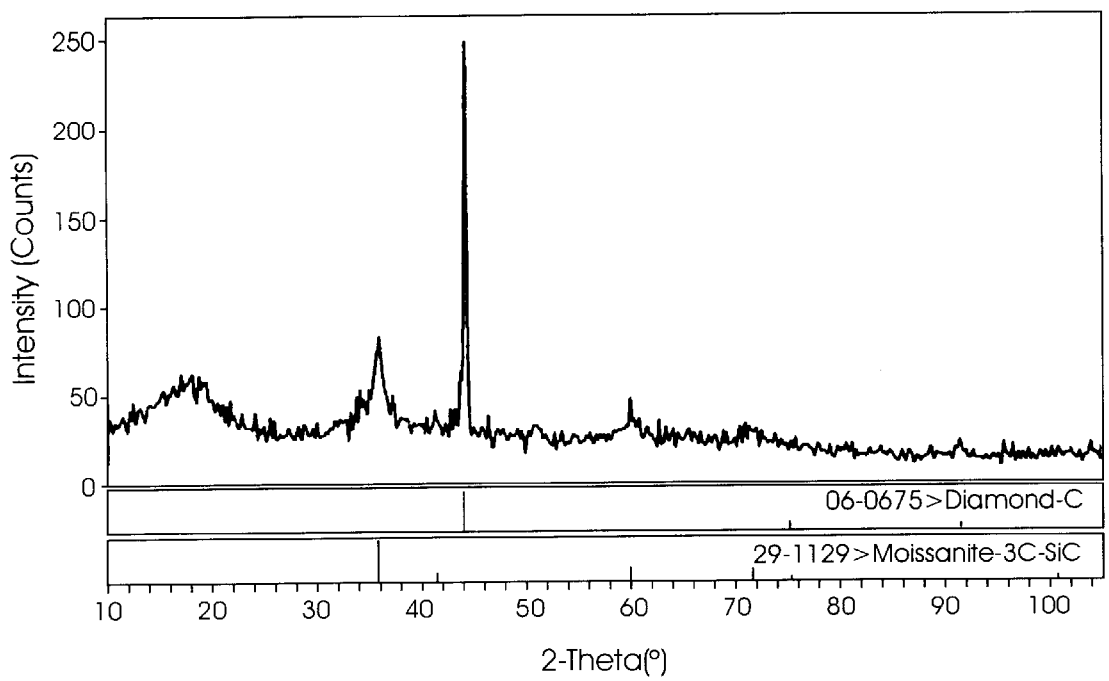
FIG. 1 displays x-ray diffraction analysis results on SiC coated diamond abrasive particles of Example 1.

The drawings will be described in more detail below.

DETAILED DESCRIPTION OF THE INVENTION

The diamond particles can be natural or synthetic. Synthetic diamond most often is used in grinding operations. Synthetic diamond can be made by high pressure/high temperature (HP/HT) processes, which are well known in the art. The particle size of the diamond is conventional in size for vitreous-bond grinding elements. Generally, the diamond grit can range in particle size from about 1 micron to about 10 mm, advantageously from about 10 to 1000 microns, and preferably from about 37 microns (400 mesh) upward to 425 microns (40 mesh). Narrow particle size distributions can be preferred according to conventional grinding technology. Cubic boron nitride (CBN) also can be coated in accordance with the precepts of the present invention, as can SiC or other abrasive particles, especially those that are not wetted by the vitreous bond matrix.

The abrasive particles are coated with at least one layer of a material of the composition, $MC_XN_YB_ZO_W$, where, M represents one or more of Ti, Si, V, Cr, Zr, Nb, Mo, Hf, Ta, W, Re or a rare earth metal, and w, x, y, and z, each range from between 0 and 3. The coating thickness of each layer is between about 0.1 and 50 microns and the number of layers is between 1 and about 50. The outermost layer has a concentration of oxygen that is higher by a factor of at least about 2 than that in the layer in direct contact with the abrasive particle and advantageously by a factor of at least about 5.

The initial step in forming the functionally graded abrasive particles is to deposit layers of material, $MC_XN_YB_Z$, by chemical vapor deposition (CVD), pack cementation, metal deposition followed by carburization, nitridation, boridation, or other methods practiced in this art, or combinations of such methods. The thickness of each layer ranges from between about 0.1 to about $50\mu$ with the number of layers ranging from 1 to about 50. A single layer, especially if relatively thick, can have its outer surface oxidized to form a functionally graded abrasive particle according to the precepts of the present invention.

Next, a chemically bonded oxide coating is formed by reaction of oxygen with the carbide/nitride/boride coated abrasive particles by high temperature annealing in air, oxygen, or an oxygen-containing gas, sintering in a glassy matrix, CVD processing, sol-gel techniques, fusion treatments in oxygen-containing molten salts, such as at least one of the alkali nitrates, alkali hydroxides, or alkali carbonates, or by other methods practiced in the art for oxidizing metal carbide/nitride/boride coatings. The glass matrix can comprise the vitreous bond itself, so that formation of the outermost oxide layer and sintering of the vitreous matrix composite occurs in a single processing step. The thus-formed oxide layer has the composition, $MC_XN_YB_ZO_W$, where M represents the metal or alloy found in the outermost layer and x, y, z, and w, range from between 0 and 3.

In another embodiment, the oxide-rich surface layer is deposited directly, rather than by oxidation of the outermost portion of the $MC_XN_YB_Z$ layer. Deposition of the oxide-rich surface layer may be performed by CVD, pack cementation, or other methods that are practiced in the art. The thus-formed oxide layer has the composition, $MC_XN_YB_ZO_W$, where M represents the metal or alloy found in the outermost layer and x, y, z, and w, range from between 0 and 3.

The novel functionally graded abrasive particles then can be combined with vitreous matrix composite materials. The mixture then can be sintered or hot-pressed following procedures common in the vitreous bond art. For vitreous bond grinding wheels, for example, the functionally graded abrasive particles are mixed with $SiO_2$, $B_2O_3$, $Na_2O$, $CaO$, $MgO$, or other similar glass forming material(s), and hot pressed. The concentration of functionally coated diamond and fabrication of such wheels is conventional and well known in that art. Broadly, such concentrations range from about 25 to 200 (100 concentration conventionally being defined in the art as 4.4 carats/cm$^3$ with 1 carat equal to 0.2 g, wherein the concentration of diamond grains is linearly related to its carat per unit volume concentration). Preferably, the concentration of diamond grit ranges from about 50–100. Grinding elements (e.g., wheels) produced using the functionally graded abrasive particles are useful for grinding a variety of metal, ceramic, and related composite materials.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

EXAMPLES

Example 1

Diamond particles (500/425$\mu$ or 35/40 mesh) were coated with SiC to an average weight percent coating of about 2.7 using a CVD process. X-ray diffraction analysis of the coatings was conducted. The coating was confirmed to be SiC, as evidenced in FIG. 1, which displays the x-ray diffraction results.

Figure 2:
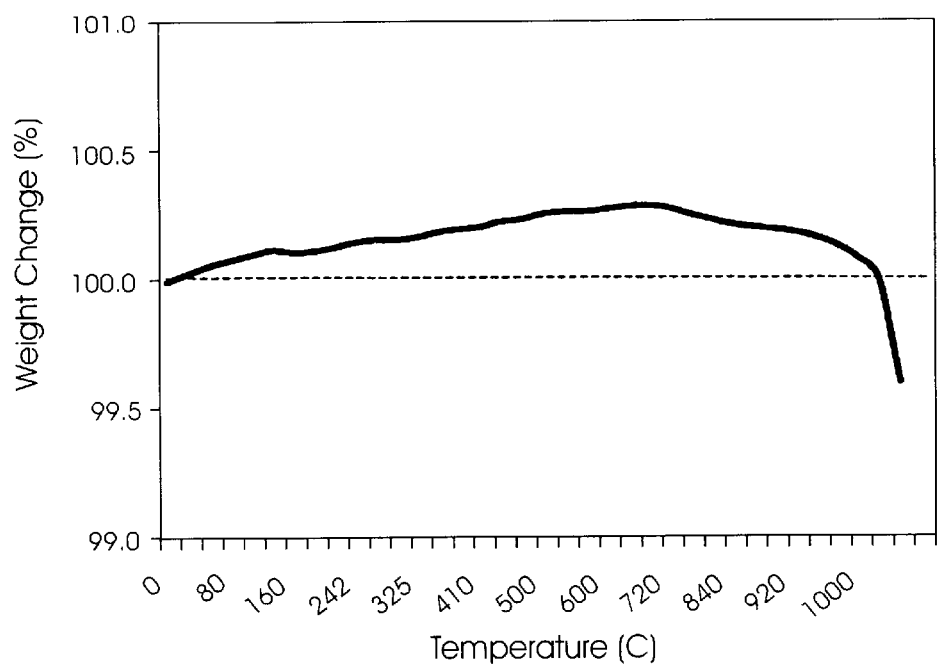
FIG. 2 provides thermogravimetric analysis (TGA) results of oxidized SiC coated diamond abrasive particles of Example 1.

The oxidation properties of the coated diamond were determined using thermogravimetric analysis (TGA). The temperature of the TGA furnace was ramped from 25° C. to 1100° C. at a rate of 10° C. per minute in static air. The weight gain of the particles, as measured by TGA, indicated the development of an oxide layer layer on the outermost portion of the coating at temperatures below 980° C. These results are plotted in FIG. 2, which plots weight percent as a function of temperature. X-ray analysis also was performed on the samples following heat treatment. These results are displayed in FIG. 3. The increased intensity of the broad, amorphous peak at low 2-theta values (peak 10) suggests the development of a $SiC_XO_W$ layer on the outermost portion of the coating. The continued presence of the SiC peaks (peaks 12 and 14) indicates that oxidation of the coating was not complete. Since oxidation proceeds from the outer surface of the SiC coating inward, these results indicate the synthesis of a functionally graded coating with the oxide concentration at the outer surface being much higher than that at the diamond/SiC interface.

Figure 4:
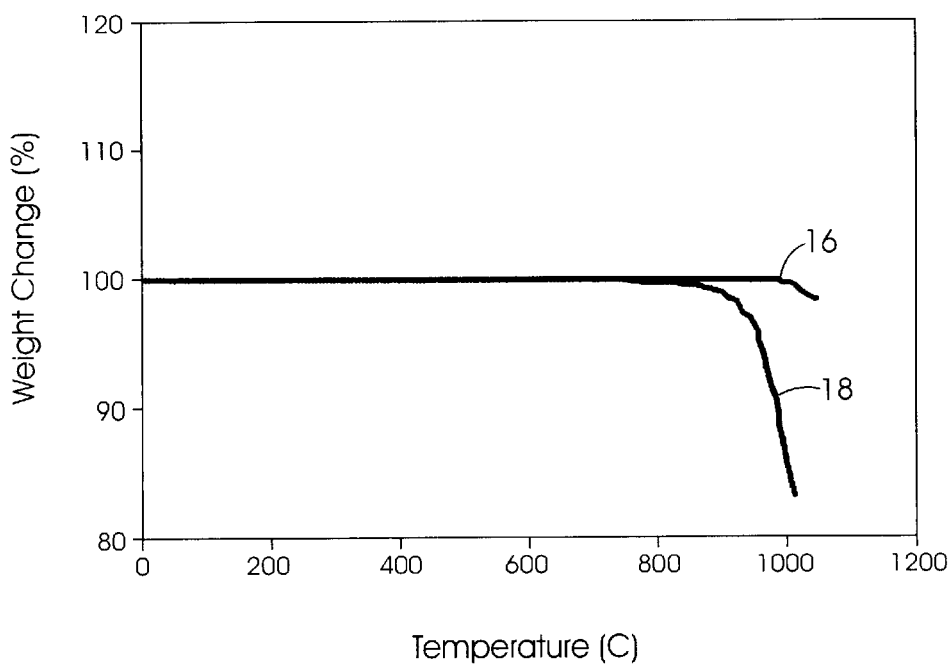
FIG. 4 provides thermogravimetric analysis (TGA) results of functionally graded SiC coated diamond abrasive particles of Example 1 compared to uncoated diamond crystals.

Heating of uncoated diamond crystals to a temperature of above about 700° C. in air introduces significant surface damage due to etching and graphitization, resulting in significant weight loss. The diamond crystals used in this example had no observable damage during heat treatment up to about 980° C. due to the protective oxycarbide coating. A graph of weight change (wt-%) as a function of temperature in static air is provided in FIG. 4 to illustrate the protective properties of the coating in comparison (line 16) to uncoated diamond crystals (line 18).

Example 2

Figure 3:
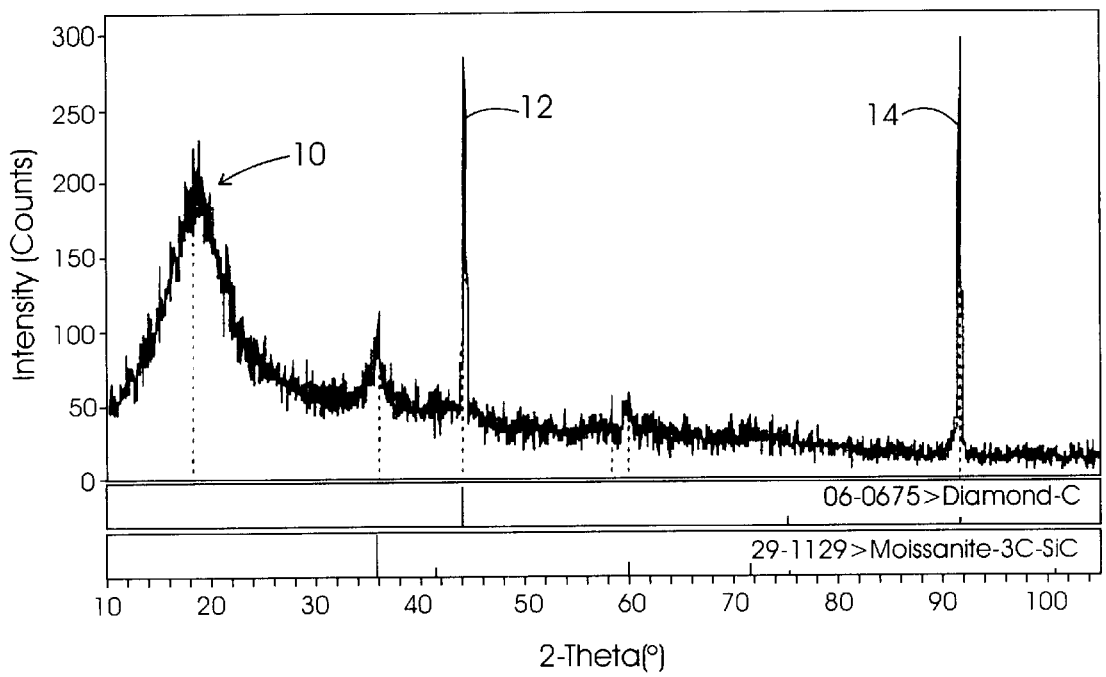
FIG. 3 displays x-ray diffraction analysis results on SiC coated diamond abrasive particles of Example 1, which have an outer oxidized layer.

In order to demonstrate the applicability of the novel functionally graded coated diamond particles, vitreous elements were fabricated using uncoated and $SiC_XO_W$ coated diamond crystals and borosilicate glass. Uncoated and SiC coated diamond crystals and glass were placed in a graphite mold and heated in static air using a standard laboratory box furnace. The temperature of the furnace was ramped from room temperature to 850° C. over a 2 hour time period. As shown in FIG. 3, an oxycarbide outer layer forms during the heating step on the surface of the diamond particles initially coated with SiC. The furnace was held at 850° C. for 1 hour and then allowed to cool for approximately 4 hours. The samples then were removed from the furnace once the temperature was less than 50° C.

Figure 5:
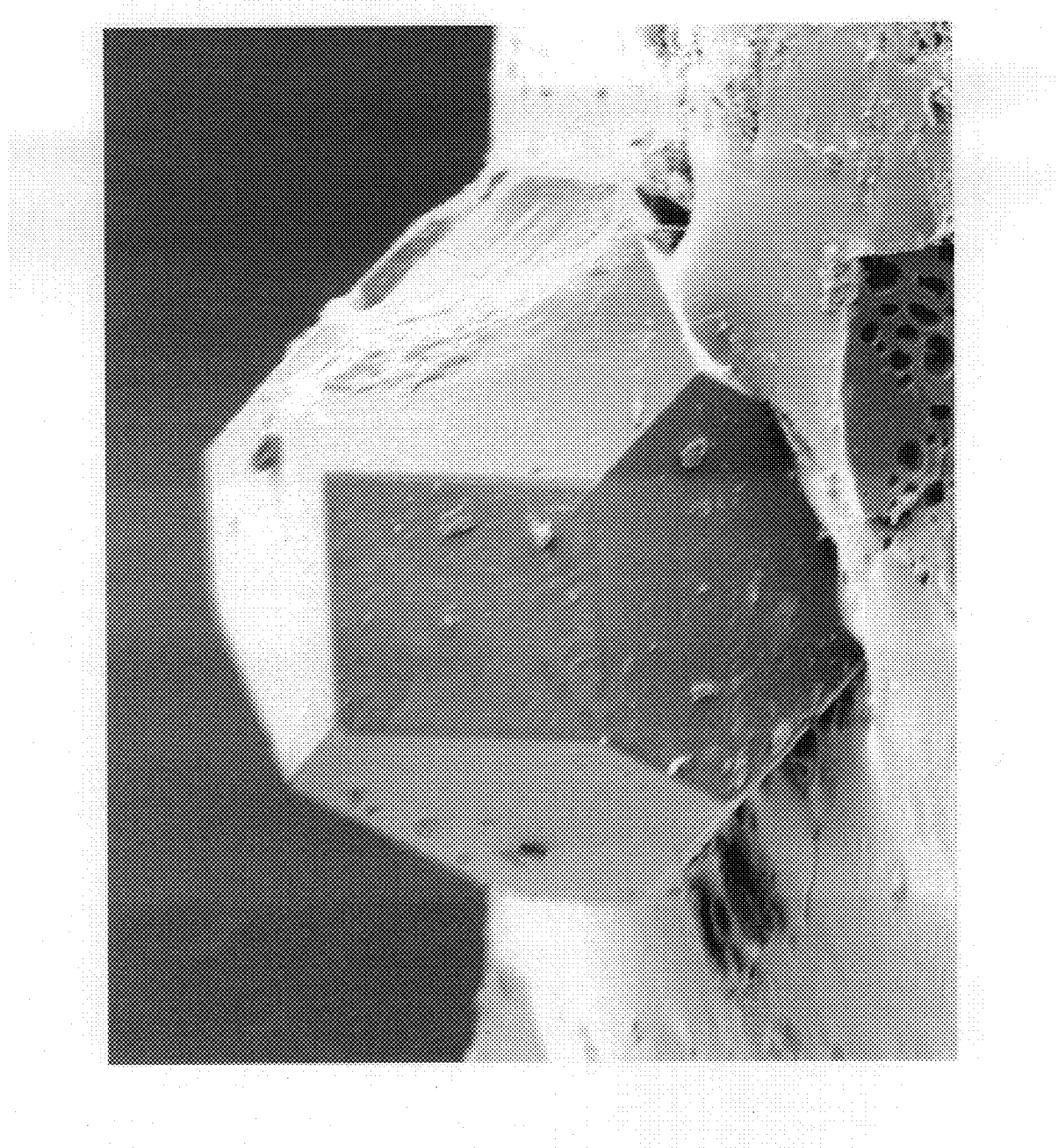
FIGS. 5 and 6 are photomicrographs from scanning electron microscopy (SEM) of uncoated diamond crystals that were blended with a borosilicate glass to form a vitreous element (62 and 110 magnification, respectively)
Figure 6:
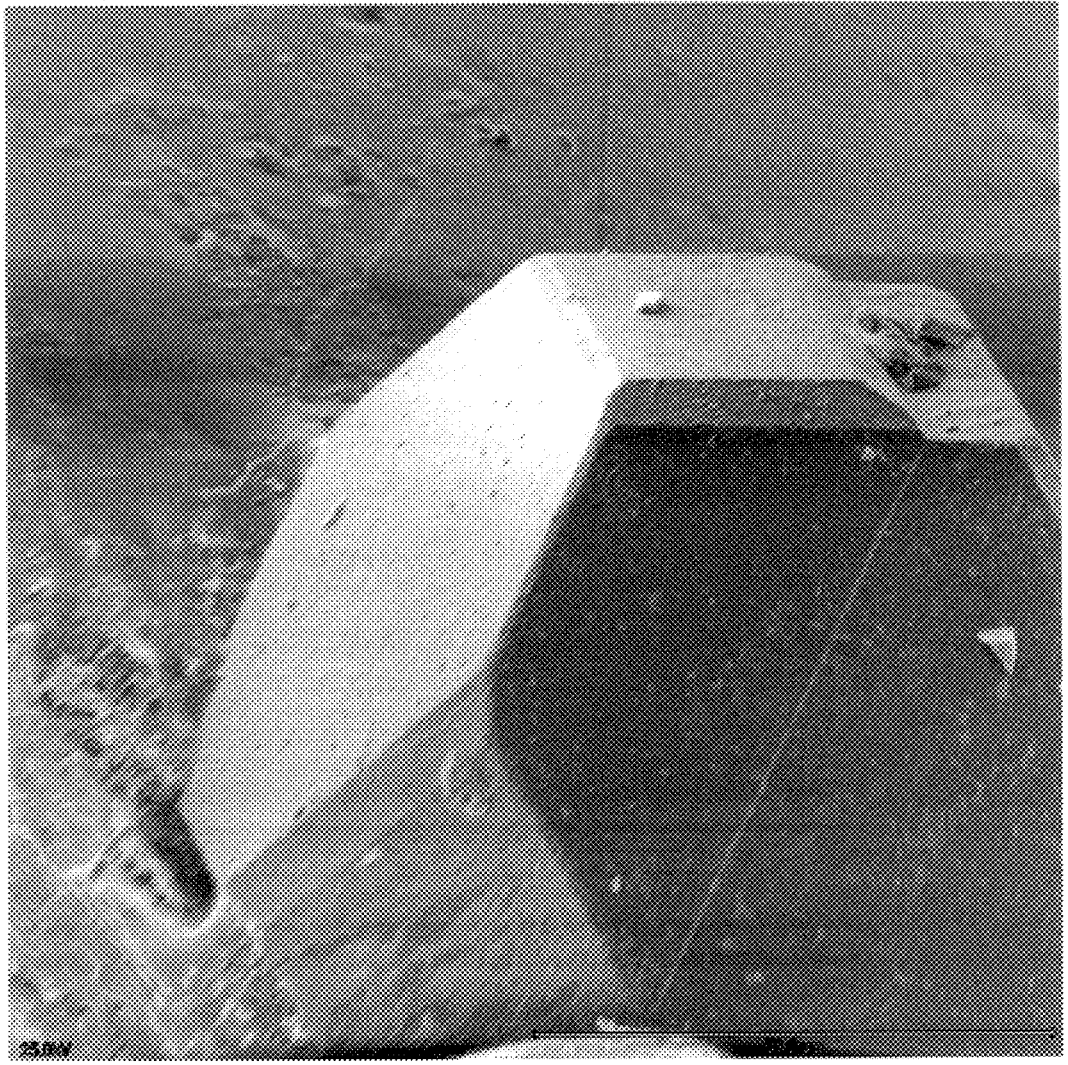
Figure 7:
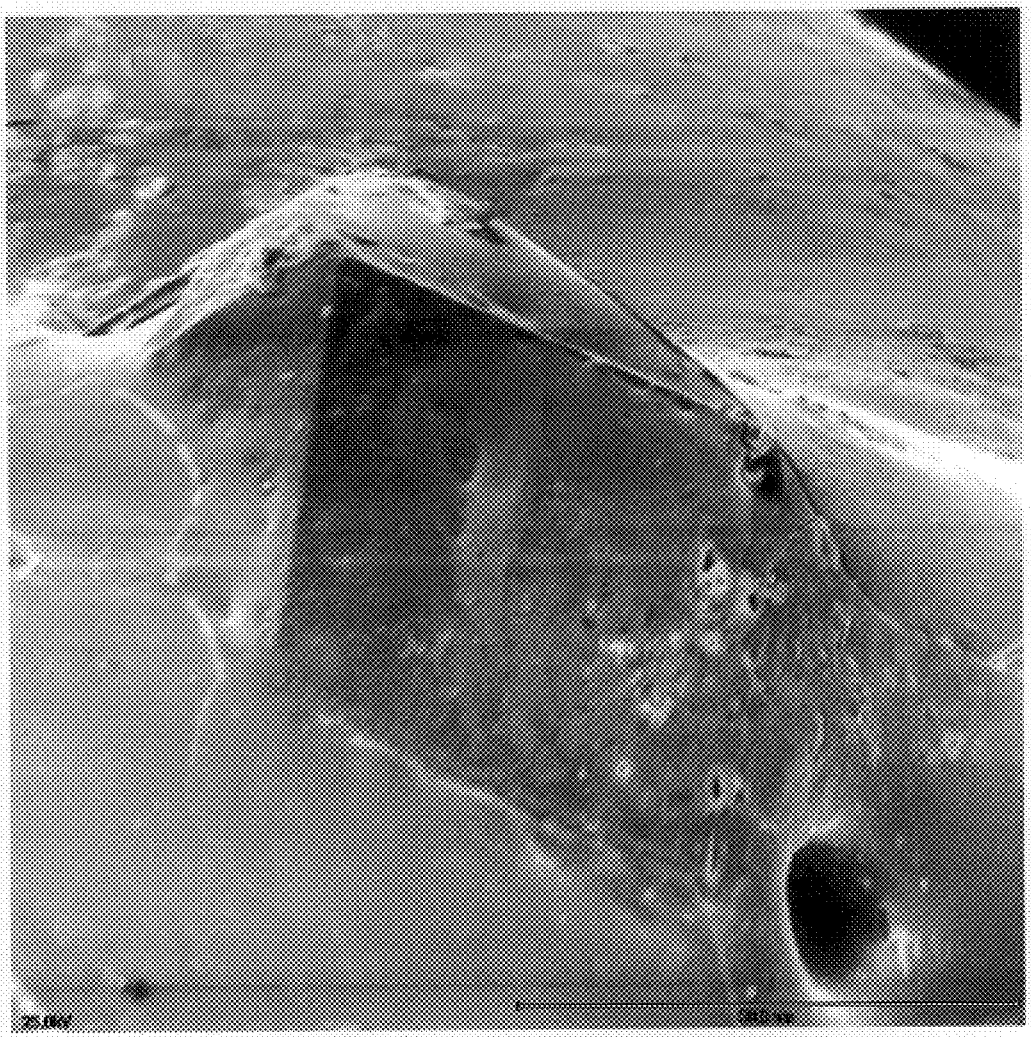
FIGS. 7 and 8 are photomicrographs from scanning electron microscopy (SEM) of $SiC_XO_W$ coated diamond crystals that were blended with a borosilicate glass to form a vitreous element (78 and 101 magnification, respectively).
Figure 8:
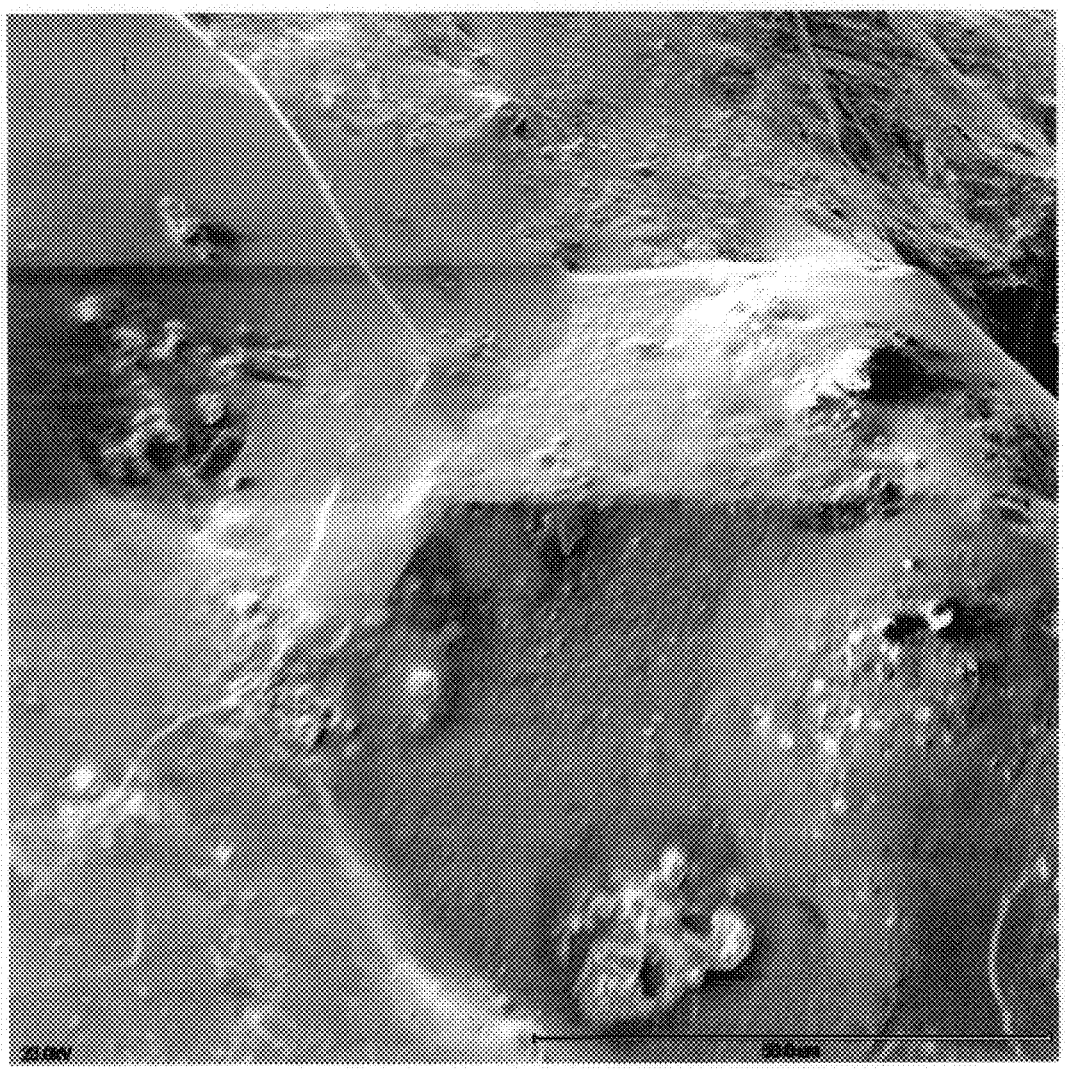

Following this heat treatment, the diamond-glass interface was analyzed by fracturing the vitreous elements and examining the fracture surfaces using scanning electron microscopy (SEM). FIGS. 5 and 6 show that the glass matrix did not wet the uncoated crystals. Furthermore, the diamond crystal surface is smooth and free from glass residue. In contrast, the $SiC_XO_W$ coated diamond crystals were wet by the glass matrix, as shown in FIG. 7 and 8. A continuous interface is present between the $SiC_XO_W$ coated diamond crystals and the glass matrix.

What is claimed is:

1. Coated abrasive particle for use in vitreous bond matrices, which comprises:

an abrasive particle coated with between 2 and about 50 coating layers, each coating layer ranging in thickness from between about 0.1 and 50 microns, each layer having the composition:

$$MC_XN_YB_ZO_W,$$

where,

M represents one or more of Ti, Si, V, Cr, Zr, Nb, Mo, Hf, Ta, W, Re or a rare earth metal, and w, x, y, and z, each range from between 0 and 3;

wherein the outermost coating layer has a concentration of oxygen and said concentration of oxygen is higher by a factor of at least about 2 than the layer in direct contact with the abrasive particle.

2. The coated abrasive particle of claim 1, wherein the outermost coating layer has concentration of oxygen that is higher by a factor of at least about 5 than the layer in direct contact with the abrasive particle.

3. The coated abrasive particle of claim 1, wherein w is 0 for the coating layer in contact with said abrasive particle.

4. The coated abrasive particle of claim 1, wherein said abrasive particle is one or more of diamond, cubic boron nitride (CBN), or silicon carbide.

5. The coated abrasive particle of claim 4, wherein said abrasive particle ranges in size from between about 1 micron and 10 mm.

6. The coated abrasive particle of claim 5, wherein said abrasive particle is diamond, which ranges from between about 37 and 425 microns.

7. A composite vitreous element, which comprises:

a vitreous matrix having abrasive particles dispersed therein, wherein said abrasive particles are coated with between 2 and about 50 coating layers, each coating layer ranging in thickness from between about 0.1 and 50 microns, each layer having the composition:

$$MC_XN_YB_ZO_W,$$

where,

M represents one or more of Ti, Si, V, Cr, Zr, Nb, Mo, Hf, Ta, W, Re or a rare earth metal, and w, x, y, and z, each range from between 0 and 3;

wherein the outermost coating layer has a concentration of oxygen and said concentration of oxygen is higher by a factor of at least about 2 than the layer in direct contact with the abrasive particle.

8. The composite vitreous element of claim 7, wherein the outermost coating layer on said abrasive particles has concentration of oxygen that is higher by a factor of at least about 5 than the layer in direct contact with the abrasive particle.

9. The composite vitreous element of claim 7, wherein w is 0 for the coating layer in contact with said abrasive particle.

10. The composite vitreous element of claim 7, wherein said abrasive particle is one or more of diamond, cubic boron nitride (CBN), or silicon carbide.

11. The composite vitreous element of claim 10, wherein said abrasive particle ranges in size from between about 1 micron and 10 mm.

12. The composite vitreous element of claim 11, wherein said abrasive particle is diamond, which ranges from between about 37 and 425 microns.

13. The composite vitreous element of claim 7, wherein said vitreous matrix is a glass forming material comprising one or more of $SiO_2$, $B_2O_3$, $Na_2O$, CaO, or MgO.

14. The composite vitreous element of claim 7, wherein said abrasive particles range in concentration from about 25 to 200.

15. The composite vitreous element of claim 7, which is a grinding element.

* * * * *